Nov. 22, 1966  R. D. BECK ETAL  3,286,730
PNEUMATIC PROGRAMMER
Original Filed Nov. 20, 1961  3 Sheets-Sheet 2
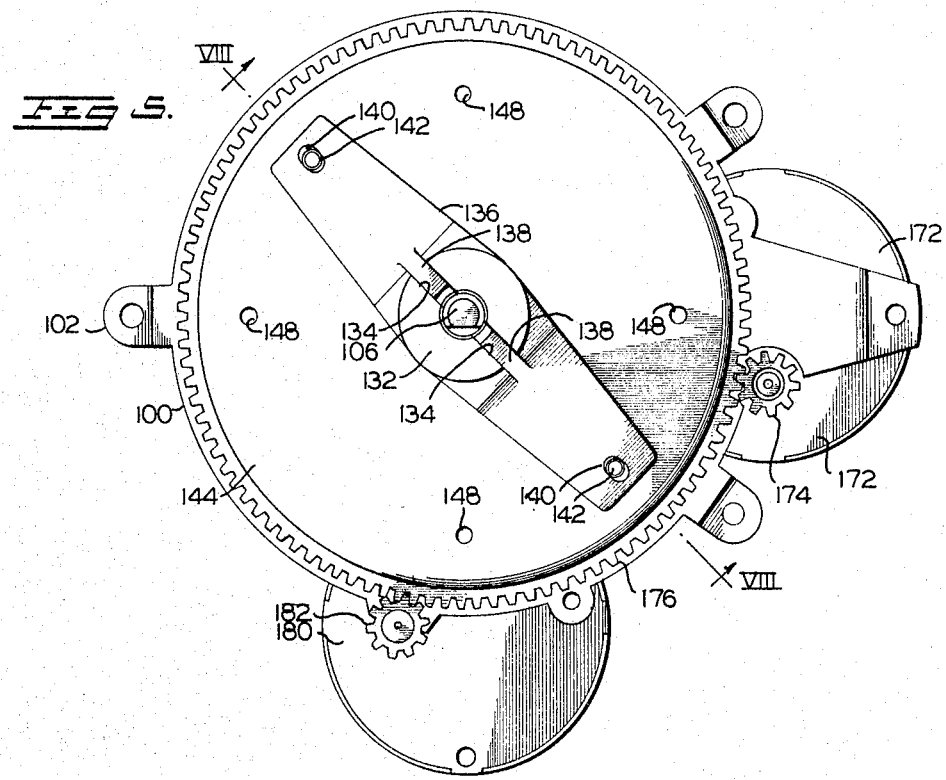
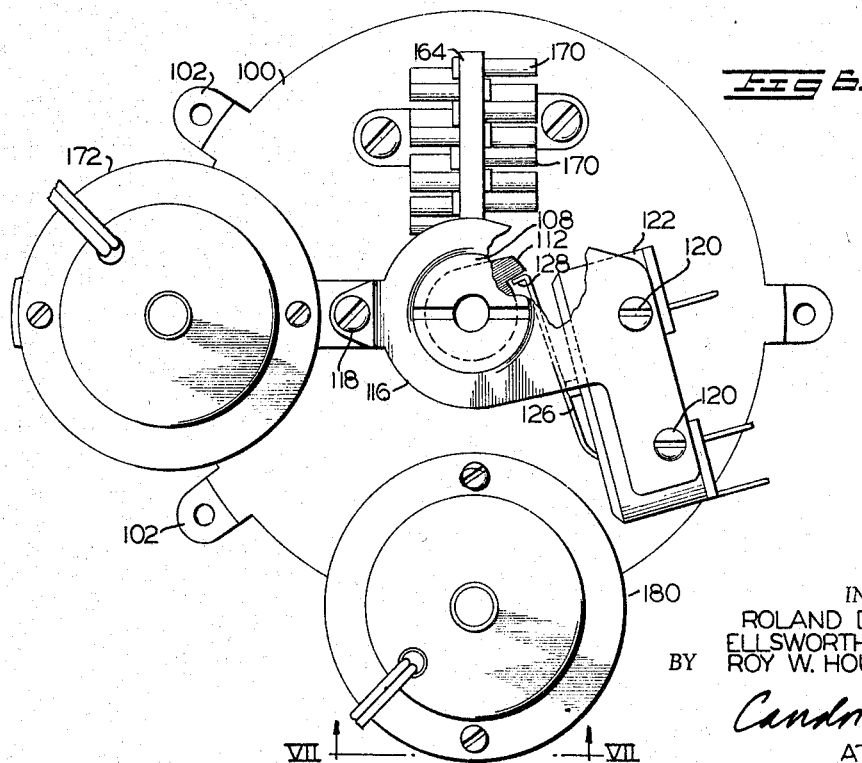
INVENTORS
ROLAND D. BECK
ELLSWORTH F. SMOCK
BY ROY W. HOUSER
*Candor & Candor*
ATTORNEYS

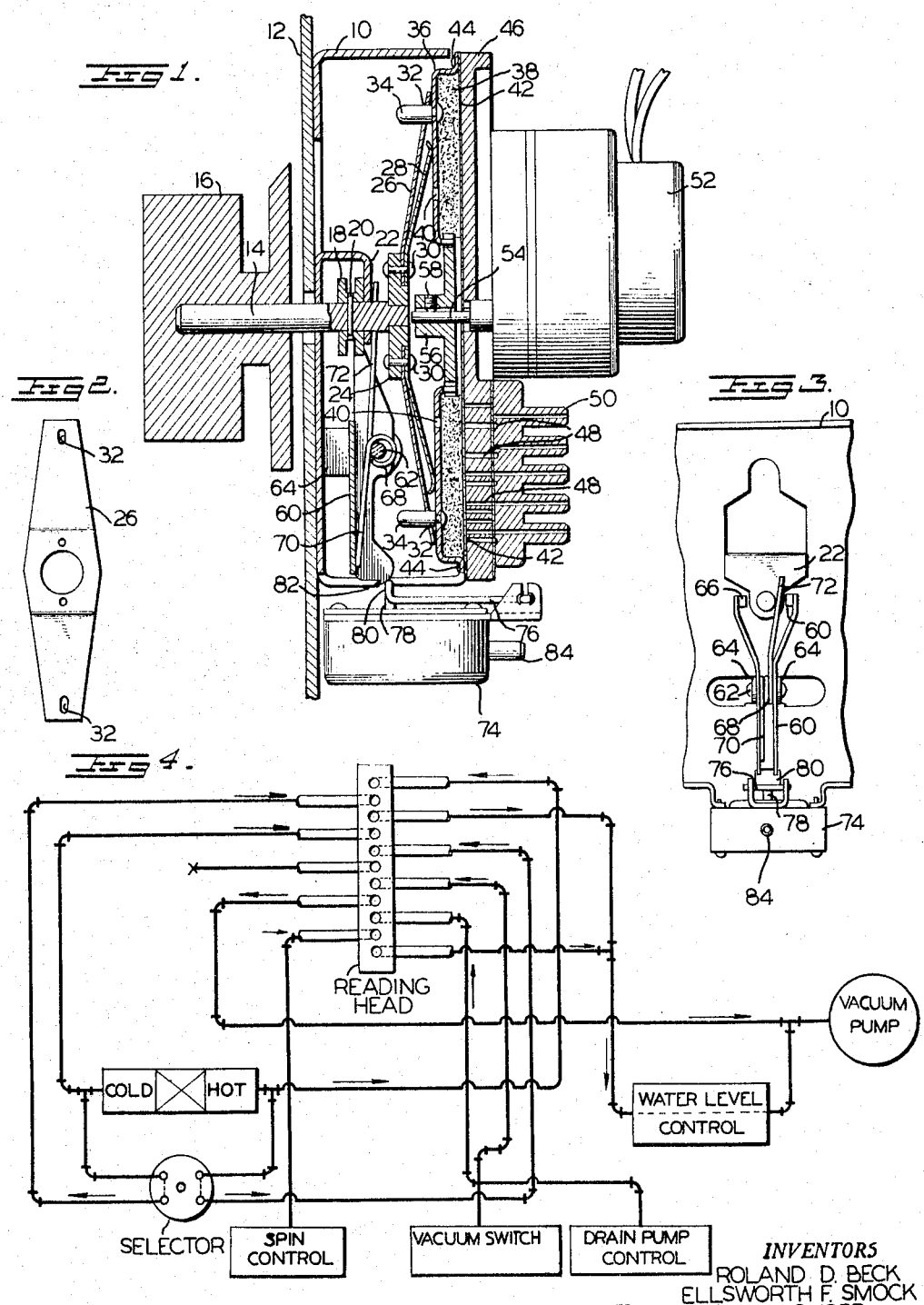

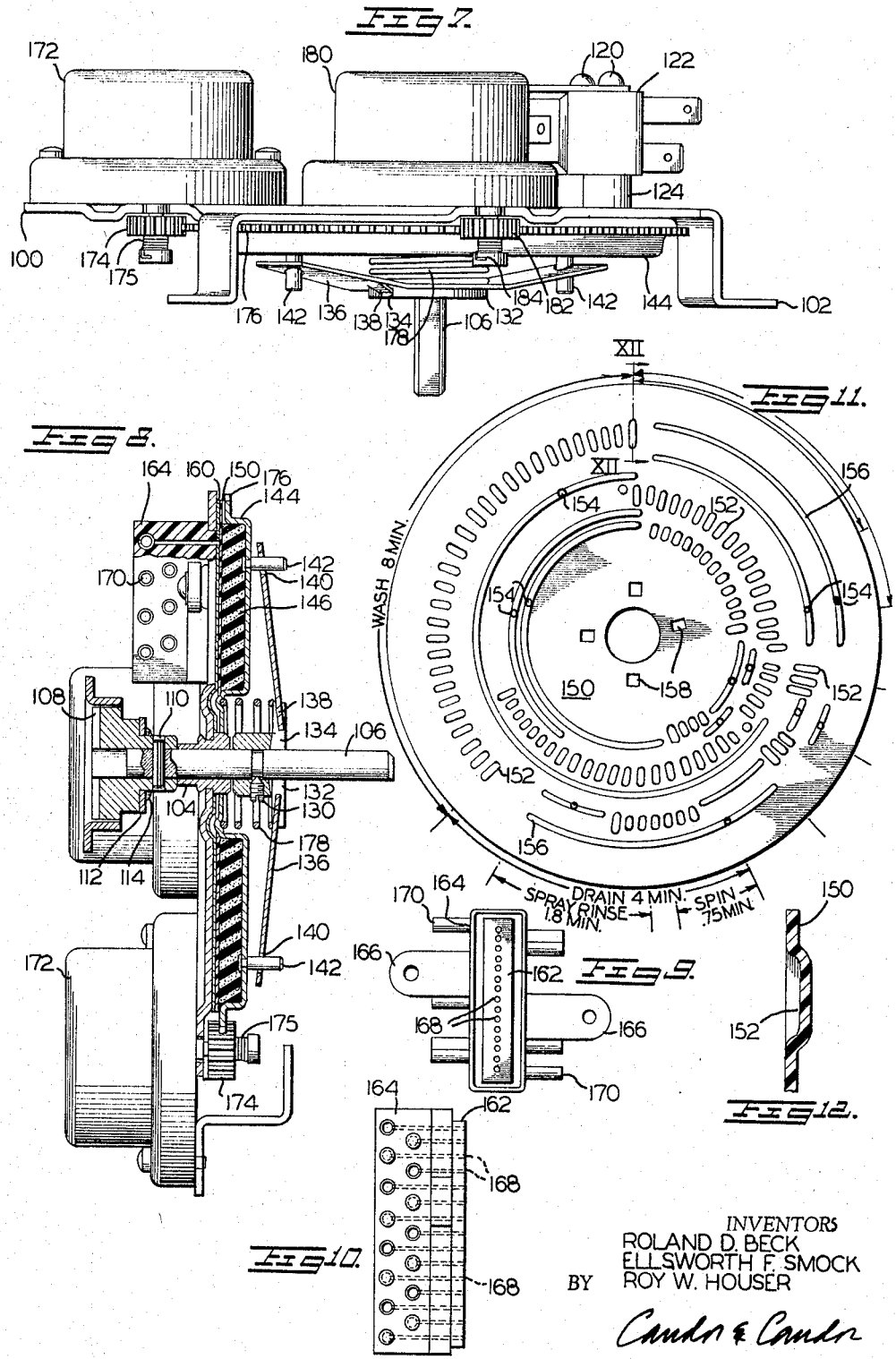

United States Patent Office 3,286,730
Patented Nov. 22, 1966

3,286,730
PNEUMATIC PROGRAMMER
Roland D. Beck and Ellsworth F. Smock, Anaheim, and Roy W. Houser, Orange, Calif., assignors to Robertshaw Controls Company, Richmond, Va., a corporation of Delaware
Continuation of application Ser. No. 153,300, Nov. 20, 1961. This application Feb. 27, 1964, Ser. No. 347,882
21 Claims. (Cl. 137—550)

This application is a continuation application of the co-pending application, Ser. No. 153,300, filed Nov. 20, 1961 entitled "Pneumatic Programmer," now abandoned.

This invention relates to pneumatic control systems for laundry apparatus and in particular to a programming mechanism for automatically effecting pneumatic control of the operating cycles associated with such apparatus.

The operation of an automatic washing machine is controlled by sequential actuation of a plurality of control devices which are utilized to effect selective cycles of operation common to modern washing machines. In the present invention, a pneumatic flow is used to actuate the plurality of control devices and the pneumatic flow from a source to the control devices is controlled by a programmer device which is correlated to the various cycles of operation.

An object of this invention is to control the operation of a machine by a pneumatic programmer device.

Another object of this invention is to utilize a flexible disc as the programming element in an automatically operated apparatus.

It is another object of this invention to eliminate the intermittent operation of a programming mechanism controlling the operating cycles of a machine.

This invention has another object in that a pneumatic programmer device is economically manufactured in a compact arrangement of relatively few and simple components.

A further object of this invention is to rotate a pneumatic programmer disc by means of a constant speed motor.

This invention has still another object in combining a filter chamber and a rotatable flexible disc in a pneumatic programmer.

It is a further object of this invention to permit rotation of a control dial shaft in a pneumatic programmer in either direction at any time, even during an operating cycle.

It is a further object of this invention to secure a flexible programming disc to the driving mechanism of a penumatic programmer device.

In practicing this invention, a flexible disc element is operatively connected to constant speed motor means for continuous rotation relative to a pneumatic flow reading head in response to energization of the motor means. The flexible disc element is provided with a plurality of channels and apertures arranged in patterns corresponding to the cycles of operation in a machine that is to be automatically operated. During its rotation the flexible disc element functions as a valve means to control a penumatic flow between a plurality of conduit openings in the reading head.

Additional features and advantages of the present invention will become apparent from the following description taken in connection with the accompanying drawings wherein:

FIG. 1 is a vertical section of a pneumatic programmer device embodying this invention;

FIG. 2 is a plan view on a reduced scale of a drive plate shown in FIG. 1;

FIG. 3 is a fragmentary rear elevation on a reduced scale of FIG. 1 with parts removed;

FIG. 4 is a schematic diagram of a pneumatic flow circuit associated with washing machine control devices;

FIG. 5 is a front elevation view of a modified pneumatic programmer device;

FIG. 6 is a rear elevation view of the device in FIG. 5;

FIG. 7 is a side elevation view looking in the direction of the arrows on line VII—VII in FIG. 6;

FIG. 8 is a section view taken along line VIII—VIII of FIG. 5;

FIG. 9 is a front elevation of the reading head and mounting therefor shown in FIG. 8;

FIG. 10 is a side elevation of the reading head of FIG. 9 but shown on an enlarged scale;

FIG. 11 is a front elevation view of the flexible disc element shown in FIG. 8; and FIG. 12 is a fragmentary section view on an enlarged scale taken along the line XII—XII of FIG. 11.

In the following description, the present invention will be correlated to the sequential control of the operating cycles of a washing machine, however, it is to be understood that the invention is not limited to washing machines but may be utilized in many other devices where it is desired to program a pneumatic flow for sequential controlling functions.

Referring now to FIG. 1, a pneumatic programmer device includes a generally hollow casing 10, the front of which is secured by any suitable means to the back surface of a mounting panel 12. A control shaft 14 extends through aligned openings in the casing 10 and panel 12 so that the free end of shaft 14 provides a mounting for a control dial or knob 16. The control knob 16 and the adjacent portions of the panel 12 are provided with suitable cooperating indicia (not shown) showing the various operating cycles of a washing machine. Inside the casing 10 a notched collar or actuator guide 18 is fixed to an intermediate portion of the control shaft 14 by means of cross pin 20. The shaft 14 and guide 18 reciprocate axially within the limits defined on one end by the inner surface of the casing 10 and on an opposite end by an apertured tab 22 which is an integral part of the casing 10 and which is bent from the front wall thereof by first and second perpendicular portions. The inner end of control shaft 14 integrally carries a disc member 24 and generally rectangular drive plate 26 and leaf spring 28 are centrally secured to the disc member 24 as by rivets 30.

The drive plate 26 has its opposite legs bent towards the rear of casing 10 and an elongated aperture 32 is located adjacent the end of each leg. The apertures 32 receive the pair of diametrically opposed pins 34 which are fixed to a ring-like dome member 36. The pins 34 and the apertures 32 form a driving connection between the dome member 36 and the plate 26 for unitary rotation. This driving connection is maintained in all axial positions of the control shaft 14 since the elongated apertures 32 permit the plate 26 to move axially with respect to the dome member 36 without binding on the pins 34. During any axial movement of the control shaft 14 and plate 26, the dome member 36 will not follow such movement because of the biasing force exerted by the leaf spring 28 which will always be in engagement with the dome member 36.

The interior of the dome member 36 forms an annular cavity that is filled with a porous resilient or plastic material 38 which serves as a filter for air entering the cavity from the interior of the casing 10 through a plurality of ports 40 located in spaced relation about the dome member 36. The casing 10 is not a sealed housing so that the interior thereof is in communication with the surrounding atmosphere. The cavity of dome member 36 is closed by a flexible disc 42 which is secured to the outer peripheral flange of the dome member 36 by any suitable fastening means 44 whereby the disc 42 and the dome member 36 rotate as a unit. The flexible disc 42 is formed from any suitable plastic material with a series of protuberances and exhaust ports (see FIG. 11) arranged in particular sequences to conform to the operating cycles of a washing machine. The porous resilient material 38 resiliently urges the flexible disc 42 against a stationary valve block 46 which comprises the rear wall of the casing 10. A plurality of spaced openings 48 extend through the valve block 46 with their inner ends cooperating with the flexible disc 42 and their outer ends cooperating with a connection block 50 for connection to the pneumatic source and the various control devices utilized in a washing machine. Although the connector block 50 shows only five conduit connectors extending from its rear face, similar connectors extend from other parts or faces of the block 50. The protuberances on the flexible disc 42 may be arranged as radial or arcuate channels or any other channel formation for channeling a pneumatic flow between selected openings 48 in the valve block. The exhaust ports in the flexible disc 42 may be a mere aperture through the disc or may be used in conjunction with an arcuate channel as shown in FIG. 11. The sectional view of FIG. 1 does not show the structural details of the flexible disc 42 which will be more fully described below in connection with FIG. 11.

An electric, constant speed, timer motor 52 is secured to the outer face of valve block 46 and has a rotatable shaft 54 extending through central apertures suitably aligned in the valve block 46 and the flexible disc 42. The free end of shaft 54 is in alignment with the normal shaft 14 but terminates in the casing 10 short of the inner end of the shaft 14 so as to be free from engagement therewith at all times. A notched rotor or sprocket wheel 56 is fixed to the free end of shaft 54 as by a screw 58. The diameter of the sprocket 56 substantially conforms to the diameter defined by inner periphery of the ring-like dome member 36; a plurality of spaced projections on the inner periphery of the dome member 36 are disposed in the notched periphery of the sprocket 56 for unitary rotation therewith.

A switch actuating lever 60 is pivotally mounted intermediate its ends on a pivot pin 62 fixed to a pair of spaced lugs 64 which are perpendicularly bent out of the front wall of casing 10. The lever 60 comprises a pair of spaced arms, the lower ends of which form a channel and the upper ends of which are spread to carry opposed projections 66 operatively positioned in the peripheral notch on the actuator guide 18. The lever 60 is urged toward its original position (FIG. 1) by a wire spring 68 having a central loop encircling the pivot pin 62 with a lower leg 70 engaging the channel web of the lower end of lever 60 for movement therewith and having an upper leg 72 prevented from movement by engaging the shaft supporting tab 22.

An electric switch 74, fixed to a bottom wall of casing 10, includes suitable contacts for connecting the electric motor 52 to a source of power and may also be utilized for closing an electric circuit associated with the washing machine operation; e.g., the driving motor for the washing machine agitator, spin basket and drain pump may be prepared for energization. The switch 74 is actuated to a circuit closing position by a cantilevered plate 76 which contacts the lower end of actuating lever 60. Opposite its mounted end, the plate 76 has a downturned portion 78 operatively associated with the switch mechanism and an upturned portion 80 for engaging a detent 82 on the lower end of actuating lever 60. An outward pull on the control knob 16 moves the shaft 14 and actuator guide 18 to the left as viewed in FIG. 1, causing counterclockwise pivoting of the actuating lever 60 which in turn flexes the plate 76 downwardly to close the contacts in the switch 74; the detent 82 retains the plate 76 in contact closing position. The internal structure of the switch 74 includes any suitable pneumatic actuator to cause opening of its contacts in response to a predetermined pneumatic signal. To this extent, a conduit connector 84 leading from the pneumatic actuator communicates with one of conduit connectors 50 and by selective positioning of the flexible disc 42, a pneumatic flow from a pneumatic source is established. The pneumatic actuator will cause a slight downward movement of the plate 76 which in turn releases the detent 82 permitting the spring 68 to pivot the lever 60 clockwise about the pivot pin 62 and thus move the control knob 16 and shaft 14 inwardly to its original position. Upon release of the detent 82, the biasing movement the lever 60 facilitates the opening of the switch contacts by removing the flexing force on the plate 76.

To operate the device shown in FIG. 1, the control knob is manually rotated either clockwise or counterclockwise to a selected cycle of operation. The consequent rotation of the shaft 14, the drive plate 26 and the dome member 36 selectively positions the flexible disc 42 relative to the openings 48 in the valve block 46. Assuming that a wash cycle has been selected, a protuberance on the flexible disc 42 spans a pair of openings 48, one of which communicates with a pneumatically operated water flow valve and the other communicates with a pneumatic source in the form of a vacuum pump. The water flow valve will be subjected to a vacuum flow traced from its pneumatic operator through a conduit leading to a conduit connector 50, through an associated opening 48, under the disc protuberance, through the spanned opening 48 and the associated conduit connector 50 to a conduit leading to the vacuum pump.

Operation of the selected wash cycle is commenced by manually pulling the control knob 16 which, as described above, causes closing of the contacts in the switch 74. An electric circuit is completed for the vacuum pump which causes opening of the water valve for a filling operation. The timer motor 52 is also energized causing its shaft 54 and sprocket 56 to rotate the dome member 36 and the flexible disc 42 at a predetermined constant speed, as for example, one revolution per hour, to complete all the operating cycles of the washing machine that are programmed on the flexible disc 42. In one actual installation, a water level switch delayed the energization of the timer motor until a predetermined water level was obtained and thence rotation of the flexible disc 42 aligns one of is ports with the opening associated with the water flow valve. The filtered air in the cavity of the dome member 36 is forced under atmospheric pressure through the port and aligned opening to permit the pneumatic operator to close the water flow valve. The flexible disc 42 is continuously rotated by the timer motor 52 until the last cycle is completed, at which time a pneumatic signal to the switch 74 causes the release of detent 82, the return inward movement of the control knob 16 and shaft 14, and the opening of the contacts in switch 74 which opens the associated electrical circuits.

The timer motor 52 may be of any conventional type which drives the flexible disc 42 in a particular rotary direction and which permits its output shaft 54 to be manually rotated in an opposite direction even during energization. By combining such a timer motor with the described structure of the pneumatic programmer device, the control knob 16 may be manually rotated in any direction during the cycling operation without causing any damage to the components.

In accordance with the above construction, the flexible disc 42 functions as a continuously moving valve member which sequentially controls the pneumatic flows between the opening 48. With prior art electrical programmers, intermittent operation by cam plates subject the timer motor to severe loads, whereas the pneumatic programmer according to the present invention is continuously moving and the problem of severe loads on the timer motor is eliminated. It should also be noted that the flexible disc 42 is interchangeable and may be easily substituted with a disc having a different program corresponding to another sequence of operating cycles for a different washing machine. This feature of an interchangeable flexible disc permits the pneumatic programmer to be utilized with all of the many different washing machines made by various appliance manufacturers.

Referring now to FIG. 5, there is shown a pneumatic programmer device adapted for special use, such as a coin operated washing machine, which requires a two speed operation for rotating the flexible disc at a selected one or two speeds. As is illustrated in FIGS. 5 and 6, a generally circular mounting plate 100 has a plurality of peripheral tabs 102 forming mounting for an indicia carrying cover plate (not shown). A centrally disposed guide bushing 104 (FIG. 8) receives a rotatable drive shaft 106, the ends of which protrude on opposite sides of the mounting plate 100. A cam bushing 108 is locked to the rear end of shaft 106 as by a cross pin 110 and a cam 112 is fixed to an annular shoulder on the cam bushing 108 as by a solder ring 114. The slotted head of the cam bushing 108 freely rotates in a short cylindrical portion of a mounting bracket 116 which is fixed to plate 100 as by screw 118. An apertured extension of the bracket 116 receives a pair of screws 120 which extend through a switch casing 122 and spacer blocks 124 (FIG. 7) for threaded engagement with the plate 100. The electric switching mechanism in the switch casing 122 is actuated by a cantilevered blade 126 having a perpendicular bent free end 128 which engages the cam 108. As is illustrated in FIG. 7, the spacer blocks 124 position the switch 122 so that the actuator end 128 properly engages the cam 108.

Adjacent its front end, the drive shaft 106 has a circumferential groove which receives a set screw 130 for locking a flanged bushing 132 to the shaft 106 at a predetermined axial position. The flanged top of the bushing 132 is provided with opposed notches 134 formed by a straight cut across the diameter. A generally rectangular drive plate 136 is centrally apertured so as to be mounted on the bushing 132 and effects a drive connection therewith by means of a pair of opposed tabs 138 bent out of the plate 136 on opposite sides of its central aperture and disposed with the flange notches 134. The drive plate 136 has its opposite legs bent towards the mounting plate 100 and an elongated aperture 140 is located adjacent the end of each leg.

The pair of apertures 140 receive a pair of diametrically opposed pins 142 which are fixed to a ring-like dome member 144 whereby the shaft 106, bushing 132, drive plate 136 and dome member 144 are rotated as a unit. The interior of the dome member 144 forms an annular cavity that is filled with a porous resilient or plastic material 146 which filters air entering the cavity through a plurality of spaced ports 148 (FIG. 5). The dome cavity is closed by a flexible disc 150 which is substantially similar to the flexible disc 42 in FIG. 1. As is illustrated in FIG. 11, the flexible disc 150 is provided with a series of spaced protuberances or raised blisters 152 and a series of apertures or exhaust ports 154 arranged in particular sequences to conform to the operating cycles of a washing machine. The ports 154 are located within arcuate blisters 156 so that a particular pneumatically operated control device may be subjected to atmospheric pressure for a predetermined part of the operating cycle. Each of the blisters 152 have a generally rectangular configuration with a major axis dimension sufficient to span or establish communication between at least two pneumatic flow openings. Adjacent its center the flexible disc 150 has four mounting slots 158 for receiving suitable fastening means whereby the disc 150 and dome member 144 rotate as a unit.

The porous resilient material 146 urges the flexible disc 150 against a backup plate 160 made of any suitable plastic material, which is fixed to the front surface of mounting plate 100. The reading head 162 of a valve block 164, which is secured to the rear face of mounting plate 100 by mounting tabs 166, extends through aligned openings in the mounting plate 100 and the backup plate 160 so as to be flush with the backup plate 160. A plurality of spaced conduit openings 168 extend through the block 164 and reading head 162; the inner ends of conduit openings 168 cooperate with the flexible disc 150 and their outer ends form conduit connectors 170 for connection to the pneumatic source and the various control devices utilized in a washing machine.

An electric, constant speed, timer motor 172 is bolted to the rear face of mounting plate 100 and its output shaft carries a pinion 174 disposed adjacent the front face of mounting plate 100 at its periphery. As is shown in FIGS. 7 and 8, a spring type overrun clutch 175 is operatively connected to the output shaft of timer motor 172. The pinion 174 drives the flexible disc 150 by meshing with gear teeth 176 integrally formed on the entire periphery of the dome member 144. A coil spring 176 encircles the intermediate portion of shaft 106 and is mounted in compression between the flange of bushing 132 and a central recess in the dome member 144; thus the dome member 144 will be biased toward the front face of mounting plate 100 in order to maintain the flexible disc 150 in sliding contact with the plastic backup plate 160.

A second timer motor 180, having a different speed than the timer motor 172, is also bolted to the rear face of mounting plate 100. An output shaft carries a pinion 182 and a spring type overrun clutch 184 (FIG. 7) is operatively associated therewith. The pinion 182 also meshes with the gear teeth 176 on the dome member 144 for rotating the flexible disc 150. The two timer motors 172 and 180 are energized in accordance with the type of operating cycle, e.g., one motor designated as a slow motor (½ r.p.m.) provides a cycling time for washing regular fabrics in a washing machine and the second motor designated as a fast motor (⅔ r.p.m.) provides a shorter cycling time for washing fabrics of the wash-n-wear type. Because of the overrun clutches 175 and 184, one of the timer motors is permitted to drive the dome member 144 while both pinions 174 and 182 are engaged with the gear teeth 176. For the same reason the dial shaft 106 may be manually rotated as by a control knob or dial (not shown) mounted on the D-shaped end of shaft 106. The manual rotation of shaft 106 is for calibration purposes but could also be utilized to effect cycle selection in a manner similar to that of shaft 14 in FIG. 1.

Assuming that a regular fabric selector has been actuated, the operation of the pneumatic programmer device shown in FIG. 5 is commenced by a coin actuated electric switch which completes an electric circuit for an apparatus furnishing a pneumatic flow, such as the vacuum pump in FIG. 4. At this time the blister shown at the top of the flexible disc 150 in FIG. 11 is spanning the top three openings 168 of the reading head 162; as is shown in FIG. 4, the vacuum operators associated with a hot and cold water mixing valve are actuated by a vacuum flow therefrom which is channeled to the conduit communicating with the vacuum pump through a water level control. The water mixing valve is closed after the initial filling of the wash tub by the water level control which includes a switch to complete the energizing circuit for the slot (½ r.p.m.) timer motor 172. The particular program shown on the flexible disc 150 provided an initial washing time of eight minutes after which the drain pump is actuated for four minutes. During this four minute drain period, there is a spray rinse for approximately 1.8 minutes using cold water, followed by an emptying period and a spin period of approximately 0.75 minute. After such drain period, the tub is again filled with warm water and agitated to perform a deep rinse for approximately one minute, followed by another minute of draining time for a second drain period. The tub is then filled a third time with warm water and agitated to perform a second deep rinse for approximately one minute followed by another draining period of approximately one minute. During the final four minutes, the spin actuator and the drain pump actuator are both operating to furnish a final spin and drain period. The flexible disc 150 rotates clockwise as viewed in FIG. 11, and the same rotary motion is viewed as being counterclockwise in the rear view of FIG. 6. At the termination of such a rotation, the cam lobe 112 flexes the actuator 126 for switch 122 to provide a means for terminating the programmer cycle in conjunction with a conventional latch type relay in the coin box mechanism (not shown).

In the above described operation, the flexible disc 150 completes one revolution in approximately twenty minutes for regular fabrics and the same programmed events are shortened in time by about 25% to fifteen minutes for wash-n-wear fabrics by selective actuation of the fast timer motor (⅔ r.p.m.).

It is apparent that the flexible disc 150 may be altered to include any desired program of cycles and by mere interchange of flexible discs, the pneumatic programmer device is adaptable for use with a wide variety of washing machines as well as other automatically controlled machines.

Inasmuch as various modifications, changes and reversal of parts will be apparent to those skilled in the art, it is intended that all matter contained in the above description or shown on the accompanying drawings shall be interpreted as illustrative and not in a limiting sense.

While the form of the invention now preferred has been disclosed as required by the statutes, other forms may be used, all coming within the scope of the claims which follow:

What is claimed is:

1. In combination, a reading head having a reading surface interrupted by a plurality of passage means, a flexible reading means having opposed surface means, said reading means having one surface means disposed against said reading surface, means for causing relative movement between said reading means and said reading head, said reading means having a channel means in said one surface means thereof for interconnecting two of said passage means together, porous compressible means disposed against substantially the entire other surface means of said reading means that is aligned with said reading surface, and means for causing said porous compressible means to urge substantially the entire one surface means of said reading means that is aligned with said reading surface into sealing engagement with said reading surface.

2. A combination as set forth in claim 1 wherein said reading means has an aperture means adapted to be aligned with one of said passage means, and wherein said porous compressible means filters the medium adapted to flow through said aperture means into said one passage means.

3. In combination, a reading head having a reading surface interrupted by a plurality of passage means, a flexible reading sheet having opposed surface means, said sheet having one surface means disposed against said reading surface, means for causing relative movement between said reading sheet and said reading head, said reading sheet having a channel means in one surface means thereof for interconnecting two of said passage means together, resilient means disposed against substantially the entire other surface means of said reading sheet that is aligned with said reading surface, and a rigid backing member for causing said resilient means to urge substantially the entire one surface means of said flexible reading sheet that is aligned with said reading surface into sealing engagement with said reading surface.

4. A combination as set forth in claim 3 wherein said reading sheet has an aperture means adapted to be aligned with one of said passage means, and wherein said resilient means filters the medium adapted to flow through said aperture means into said one passage means.

5. In combination, a reading head having a reading surface interrupted by a plurality of passage means, a flexible reading means having opposed surface means, said reading means having one surface means disposed against said reading surface, means for causing relative movement between said reading means and said reading head, said reading means having a channel means and an aperture means in said one surface means thereof, said channel means being adapted to interconnect two of said passage means together, said aperture means being adapted to be aligned with one of said passage means, filter means for filtering the medium adapted to flow through said aperture means into said one passage means, said filter means being disposed against substantially the entire other surface means of said reading means that is aligned with said reading surface to urge substantially the entire one surface thereof that is aligned with said reading surface into sealing engagement with said reading surface, and a rigid backing means interconnected to said reading means to move in unison therewith, said backing means compressing said filter means between said backing means and said reading means.

6. In combination, a reading head having a reading surface interrupted by a plurality of passage means, a flexible reading sheet having opposed surface means, said reading sheet having one surface means disposed against said reading surface, means for causing relative movement between said reading sheet and said reading head, said reading sheet having a channel means and an aperture means in said one surface means thereof, said channel means being adapted to interconnect two of said passage means together, said aperture means being adapted to be aligned with one of said passage means, filter means for filtering the medium adapted to flow through said aperture means into said one passage means, said filter means being disposed against substantially the entire other surface means of said reading sheet that is aligned with said reading surface to urge substantially the entire one surface thereof that is aligned with said reading surface into sealing engagement with said reading surface, and a rigid backing member interconnected to said reading sheet to move in unison therewith, said backing member compressing said filter means between said backing member and said reading sheet.

7. In a pneumatic programmer device, the combination comprising a pneumatic flow reading head, a plurality of conduit openings in said reading head, a flexible element operatively disposed for moving contact with said reading head, a plurality of apertures and a plurality of raised channels arranged on said flexible element in a predetermined pattern for sequentially controlling a pneumatic flow between said openings, a porous resilient material operatively disposed adjacent said flexible element for filtering flow through said apertures, means cooperating with said resilient material for biasing said flexible element into surface contact with said reading head, and driving means operatively connected to said flexible element for moving the same at a constant speed past said reading head.

8. In a pneumatic programmer device, the combination comprising a valve block reading head, a plurality of conduits in said reading head, one end of said conduits adapted to be connected to a source of pneumatic flow and a plurality of pneumatically operated control devices, the other ends of said conduits defining pneumatic flow openings, a flexible disc element operatively disposed for cooperation with said reading head, a plurality of channel means and aperture means arranged in a predetermined pattern on said flexible disc element for sequential registration with said flow openings, mounting means for said disc element including a filter cavity adapted to be subjected to the surrounding atmosphere, a filtering material disposed in said cavity and biasing said flexible disc element into engagement with said reading head, and motor means operatively connected to said mounting means for moving said disc element at a constant speed relative to said reading head.

9. The combination as recited in claim 8 wherein said channel means are raised blisters integrally formed on said flexible disc element with a dimension to span at least two of said flow openings, and wherein said aperture means on said flexible disc element permit a filtered air flow from said filter cavity to said flow openings in registry with said aperture means.

10. In a pneumatic programmer device, the combination comprising a support member, a valve block reading head fixed to said support member, a plurality of pneumatic flow conduits in said reading head, a rotatable member disposed in space relation to said reading head, a flexible disc element secured to said rotatable member and cooperating therewith to form a cavity, a resilient material disposed in said cavity and biasing said flexible disc element toward said reading head, means on said flexible disc element cooperating with said pneumatic flow conduits to permit a pneumatic flow therebetween, a shaft member operatively connected to said rotatable member for unitary rotation therebetween, timer motor means operatively connected to rotate said rotatable member and said flexible disc element at a constant speed, switch means operatively associated with timer motor means, and switch actuating means carried by said shaft member and being operative to effect actuation of said switch means.

11. The combination as recited in claim 10 wherein said rotatable member comprises an annular dome member, and resilient means biases said dome member toward said reading head.

12. The combination as recited in claim 10 wherein said shaft member extends through said support member for manual rotation whereby said rotatable member and said flexible disc element may be positioned relative to said reading head independently of said timer motor means.

13. In a pneumatic programmer device for sequentially controlling a vacuum flow between a vacuum pump and a plurality of vacuum operated control devices, the combination comprising a support member, a valve block reading head fixed to said support member, a plurality of pneumatic flow conduits in said reading head, at least one of said conduits being adapted for connection to the vacuum pump and the other of said conduits being adapted for connection to said vacuum operated control devices, an apertured dome member having a filter cavity, a flexible disc element secured to said dome member and forming a closing wall for said cavity, a resilient porous material disposed in said cavity and urging said flexible disc element into engagement with said reading head, a plurality of spaced apertures extending through said flexible disc element and registrable with said pneumatic flow conduits to subject said vacuum operated control devices to atmospheric pressure by means of filtered air in said cavity, a plurality of raised channels integrally formed on said flexible disc element and being registrable with said pneumatic flow conduits to subject the vacuum operated control devices to the vacuum pump, said spaced apertures and raised channels being arranged on said flexible disc in a predetermined pattern whereby the vacuum operated control devices are sequentially actuated in a corresponding pattern, timer motor means operatively connected to said dome member for rotating said flexible disc element at a constant speed relative to said reading head, and a dial shaft extending through said support member and being operatively connected to said dome member for positioning said flexible disc element relative to said reading head independently of said timer motor means.

14. In a pneumatic programmer device, the combination comprising a pneumatic flow reading head, a plurality of conduit openings in said reading head, a flexible disc element having one surface operatively disposed for moving contact with said reading head, a plurality of raised blisters integrally formed on said flexible disc element and arranged in spaced relation along an arcuate portion of said disc element, elongated arcuate channel means formed on said flexible disc element, venting means for said arcuate channel means, said raised blisters and said channel means arranged on said flexible disc element in a predetermined pattern for sequential cooperation with the conduit openings in said reading head, porous compressible means disposed against substantially the entire other surface of said flexible disc element that is aligned with said reading head and urging substantially the entire one surface thereof that is aligned with said reading head into sealing engagement with said reading head, and means operatively connected to said flexible disc element for moving the same relative to said reading head.

15. In combination, a reading head having a reading surface interrupted by a plurality of passage means, a flexible reading means having opposed surface means, said reading means having one surface means disposed against said reading surface, said reading means having a channel means in said one surface means thereof for interconnecting two of said passage means together and having aperture means passing therethrough to be aligned with one of said passage means, a backing member interconnected to said reading means and having an outer flange, a resilient porous filter means compressed between said reading means and said backing member to urge said reading means into sealing engagement with said reading surface and for filtering flow through said aperture means, and a moving means cooperating with said outer flange of said backing member for driving said reading means relative to said reading surface.

16. A combination as set forth in claim 15 wherein said reading means rotates about an axis disposed perpendicular to said reading surface and wherein said flange of said backing member is an annular peripheral flange.

17. A combination as set forth in claim 16 wherein said peripheral flange has outwardly directed gear teeth and wherein said moving means includes a pinion gear disposed in meshing relation with said gear teeth of said backing member.

18. A combination as set forth in claim 17 wherein said moving means includes an electrical motor for rotating said pinion gear.

19. A combination as set forth in claim 15 and including resilient means for urging said backing member toward said reading surface.

20. A combination as set forth in claim 15 wherein said reading means comprises an annular flat flexible member and wherein said backing member comprises an annular cup-shaped member receiving said flexible member in the open end thereof.

21. In a pneumatic programmer device, the combination comprising a pneumatic flow reading head, a plurality of conduit openings in said reading head, a flexible disc element having one surface operatively disposed for moving contact with said reading head, a plurality of raised blisters integrally formed on said flexible disc element and arranged in spaced relation along an arcuate portion of said disc element, elongated arcuate channel means formed on said flexible disc element, venting means for said arcuate channel means, said raised blisters and said channel means arranged on said flexible disc element in a predetermined pattern for sequential operation with the conduit openings in said reading head, means operatively connected to said flexible disc element for moving the same relative to said reading head, a porous resilient material disposed adjacent another surface of said flexible disc element opposite to said one surface for filtering flow through said venting means, and means cooperating with said resilient material for biasing said one surface into engagement with said reading head.

References Cited by the Examiner

UNITED STATES PATENTS

| | | | |
|---|---|---|---|
| 1,121,140 | 12/1914 | Schoonmaker | 137—625.21 |
| 1,798,952 | 3/1931 | Pellegrino | 251—248 X |
| 2,341,041 | 2/1944 | Hauser | 137—624.18 |
| 2,351,732 | 6/1944 | Almond | 137—550 X |
| 2,530,622 | 11/1950 | Maris | 137—625.15 |
| 2,608,252 | 8/1952 | Candor | 68—12 X |
| 2,844,167 | 7/1958 | Griswold | 137—624.21 |
| 3,086,836 | 4/1963 | Ohmann | 8—158 |
| 3,099,022 | 7/1963 | Geschka et al. | 8—158 |
| 3,124,161 | 3/1964 | Yaindl | 137—624.18 |

WILLIAM F. O'DEA, *Primary Examiner.*

WILLIAM I. PRICE, ALAN COHAN, *Examiners.*